P. A. JESBERG.
SALES BOOK AND FOOT MEASURING DEVICE AND RECORD.
APPLICATION FILED DEC. 16, 1915.

1,233,481.

Patented July 17, 1917.

Witnesses:

Inventor
Paul A Jesberg
By Frederick Whyer
atty.

P. A. JESBERG.
SALES BOOK AND FOOT MEASURING DEVICE AND RECORD.
APPLICATION FILED DEC. 16, 1915.

1,233,481.

Patented July 17, 1917.
2 SHEETS—SHEET 2.

Fig. 6.

| AAA | AA | A | | B | C | D |
|---|---|---|---|---|---|---|
| 6 1/8 | 6 3/8 | 6 5/8 | 33 | 6 7/8 | 7 1/8 | 7 3/8 |
| 6 1/4 | 6 1/2 | 6 3/4 | 34 | 7 | 7 1/4 | 7 1/2 |
| 6 3/8 | 6 5/8 | 6 7/8 | | 7 1/8 | 7 3/8 | 7 5/8 |
| 6 1/2 | 6 3/4 | 7 | 35 | 7 1/4 | 7 1/2 | 7 3/4 |
| 6 5/8 | 6 7/8 | 7 1/8 | | 7 3/8 | 7 5/8 | 7 7/8 |
| 6 3/4 | 7 | 7 1/4 | 36 | 7 1/2 | 7 3/4 | 8 |
| 6 7/8 | 7 1/8 | 7 3/8 | | 7 5/8 | 7 7/8 | 8 1/8 |
| 7 | 7 1/4 | 7 1/2 | 37 | 7 3/4 | 8 | 8 1/4 |
| 7 1/8 | 7 3/8 | 7 5/8 | | 7 7/8 | 8 1/8 | 8 3/8 |
| 7 1/4 | 7 1/2 | 7 3/4 | 38 | 8 | 8 1/4 | 8 1/2 |
| 7 3/8 | 7 5/8 | 7 7/8 | | 8 1/8 | 8 3/8 | 8 5/8 |
| 7 1/2 | 7 3/4 | 8 | 39 | 8 1/4 | 8 1/2 | 8 3/4 |
| 7 5/8 | 7 7/8 | 8 1/8 | | 8 3/8 | 8 5/8 | 8 7/8 |
| 7 3/4 | 8 | 8 1/4 | 40 | 8 1/2 | 8 3/4 | 9 |
| 7 7/8 | 8 1/8 | 8 3/8 | | 8 5/8 | 8 7/8 | 9 1/8 |
| 8 | 8 1/4 | 8 1/2 | 41 | 8 3/4 | 9 | 9 1/4 |
| 8 1/8 | 8 3/8 | 8 5/8 | | 8 7/8 | 9 1/8 | 9 3/8 |
| 8 1/4 | 8 1/2 | 8 3/4 | 42 | 9 | 9 1/4 | 9 1/2 |
| 8 3/8 | 8 5/8 | 8 7/8 | | 9 1/8 | 9 3/8 | 9 5/8 |
| 8 1/2 | 8 3/4 | 9 | 43 | 9 1/4 | 9 1/2 | 9 3/4 |
| 8 5/8 | 8 7/8 | 9 1/8 | | 9 3/8 | 9 5/8 | 9 7/8 |
| 8 3/4 | 9 | 9 1/4 | 44 | 9 1/2 | 9 3/4 | 10 |
| 8 7/8 | 9 1/8 | 9 3/8 | | 9 5/8 | 9 7/8 | 10 1/8 |
| 9 | 9 1/4 | 9 1/2 | 45 | 9 3/4 | 10 | 10 1/4 |
| 9 1/8 | 9 3/8 | 9 5/8 | | 9 7/8 | 10 1/8 | 10 3/8 |
| 9 1/4 | 9 1/2 | 9 3/4 | 46 | 10 | 10 1/4 | 10 1/2 |

Fig. 7.

Witnesses:

Inventor
Paul A. Jesberg
By Frederick Thyson Atty.

UNITED STATES PATENT OFFICE.

PAUL A. JESBERG, OF LOS ANGELES, CALIFORNIA.

SALES-BOOK AND FOOT-MEASURING DEVICE AND RECORD.

1,233,481.  Specification of Letters Patent.  Patented July 17, 1917.

Application filed December 16, 1915. Serial No. 67,294.

*To all whom it may concern:*

Be it known that I, PAUL A. JESBERG, a citizen of the United States, residing at Los Angeles, in the county of Los Angeles and State of California, have invented a new and useful Sales-Book and Foot-Measuring Device and Record, of which the following is a specification.

In general an object of this invention is to make provision whereby a record of consummated and unconsummated sales may be had so as to aid the manager of a department in judging of the salesmanship of the salesmen in his department.

Another object is to make provision for readily obtaining records of the lengths, widths and ball-measurements of the feet of intending purchasers of foot wear in connection with sales slips, on which, if the sales are made, the amounts of the purchases and any other desired memoranda appear.

Another object is to effect the foregoing by a simple and efficient device capable of being carried in a pocket of the salesman.

Other objects and advantages may appear hereinafter.

The accompanying drawings illustrate the invention:

Fig. 6 is a plan view of one of the foldable leaves of the pad showing the chart complete.

Fig. 7 is a diagrammatic view of one of the leaves of the pad folded with the copying paper between the folded portions so that the duplicate sales slips on both sides of the leaf will be uppermost ready for writing on.

Figure 1:
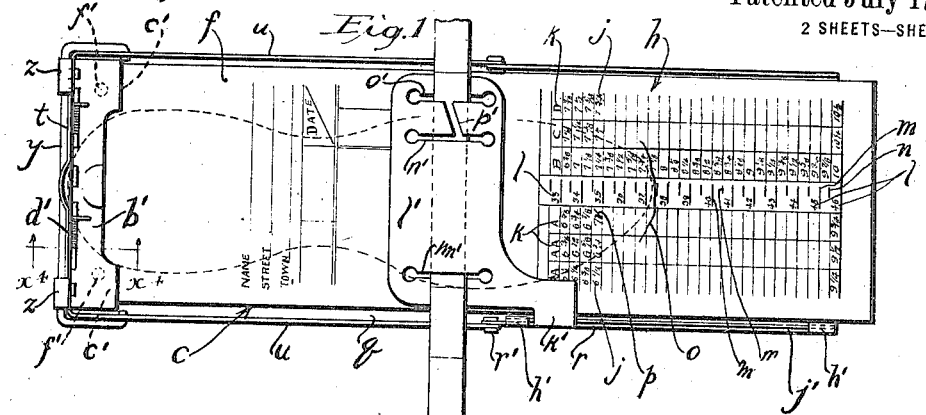
Figure 1 is a plan view of the invention, the parts being in the foot measuring positions and a foot being indicated in broken lines, the pad-holding means also being shown.

There is provided a foldable pad comprising a totalizing sheet $a$, a backing $b$ and foldable leaves $c$ all fastened together by suitable means as wire clips $d$ or the like. Along one edge of the backing $b$ there is fastened by glue or the like a sheet $e$ of carbon copying paper which may be interposed between the folded parts of any one of the leaves when said leaf is folded.

Each of the leaves of the pad is provided on its obverse side and on its reverse side with suitable printed matter to form two corresponding or duplicate sales slips $f$, $g$ adapted when the sheet is folded as indicated in Fig. 7 with the slip $g$ uppermost to be superposed so that by placing the carbon sheet between them and writing on the uppermost slip $g$ which may be termed original slip, a carbon copy of the writing is made on the under slip which may be termed copy slip.

At the lower portion of each sheet on the obverse side thereof below the copy slip $f$ and on the back of the original slip $g$ there is provided a table or chart $h$ of measurements, said table being constructed as follows:

The back of each original slip $g$ is provided with longitudinally extending columns of measurement-indicating characters $j$ as, for example, numerals $6\frac{1}{8}$, $6\frac{1}{4}$, $6\frac{3}{8}$, etc., there being at the head of each column width-indicating signs $k$ respectively as, for instance, AAA, AA, A, B, C, D, and said signs being different for the different columns.

The measurement-indicating characters $j$ represent measurements around feet of different sizes of intending purchasers at the ball of the foot, and for purposes of description said characters are herein termed ball-measurement characters to distinguish from the signs $k$ representing measurements of width of feet of different widths.

The columns of characters $j$ are arranged on both sides of a longitudinally extending column of length-indicating characters $l$, as, for example, numerals 33, 34, 35, etc., said column of characters $l$ being substantially midway of the width of the sheet and said characters $l$ representing measurements of length of feet.

The characters $j$ may run consecutively by differences of, for example, one-eighth of an inch from 6⅛ to 9¼ in the column headed AAA and from 6⅜ to 9½ in the column headed AA and from 6⅝ to 9¾ in the column headed A and from 6⅞ to 10 in the column headed B and from 7⅛ to 10¼ in the column headed C and from 7⅜ to 10½ in the column headed D.

The characters *l* may run consecutively by differences of, for example, one from 33 to 46, said characters being adjacent equally spaced lines or graduations *m*, there being midway between adjacent graduations *m* other equally spaced graduations *n*.

The characters *j*, *k* and *l* thus altogether constitute a measurement-record table on which may be recorded the length, width and ball-measurement of the intending purchaser's foot. It is noted that for each length-indicating character and graduation *n* there are six different ball-measurement characters, one in each width-indicating column, said ball-measurement characters for any given length-indicating character being in alinement therewith transversely of the pad. The measurements are indicated by the salesman drawing a line, as indicated at *o*, at the ends of the toes of the customer's foot and checking off, as indicated at *p*, the ball-measurement of said foot, the check mark being made in the column having the width-indicating sign or character *k* indicating a width of foot corresponding to the customer's foot.

The pad when folded may be embraced between the two sides of a foldable cover constructed of metal or other suitable material and comprising lower and upper sections *q*, *r* which are hinged together at *r'*, and said lower cover section is provided at its top or free end at the stub end of the pad with means forming a folding abutment *t* against which one end of the person's foot to be measured is placed so that the other end of the foot will rest on the measurement-record table, and said folding abutment together with its parts being constructed as will now be described.

The cover section *q* is provided with side flanges *u* having longitudinal slots *w* in which is shiftably accommodated the in-turned ends *x* of a U-shaped member *y* formed of wire or other suitable material. The intermediate portion of the U-shaped member *y* engaging knuckles *z* formed near the ends of the abutment *t* which in the instance shown in the drawing is in the form of a flat plate that is hinged by a pintle *s* to an end flange *a'* of the cover section *q*. The pintle *s* hingedly connects to the end flange *a'* and to the abutment *t* a clip-member *b'* provided at its free edge with teeth *c'* adapted to engage the upper side of the stub of the pad, said clip-member being yieldingly held toward the pad by springs *d'* surrounding the pintle *s* and having their opposite ends engaging the end flange *a'* and the clip member so as to detachably hold the pad in place in order that a new pad may be substituted in place of a pad from which all the leaves have been used.

The pad may be provided with perforations *e'* engaged by pins *f'* which project perpendicularly from the inner face of the cover section *q* beneath the clip-member *b'*. The pins *f'* being positioned at a definite distance from the abutment plate *t* enables the graduations *m*, *n* on the leaves of the pad to be definitely located relative to the inner face of the abutment plate so as to insure correct measurements when successive pads are used in the device, it being understood that all pads will have their perforations *e'* positioned uniformly relative to the graduations on the leaves.

Figure 2:
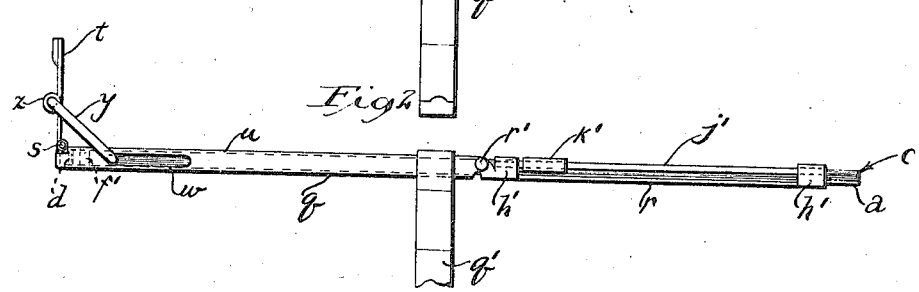
Fig. 2 is a side elevation of Fig. 1.
Figure 4:
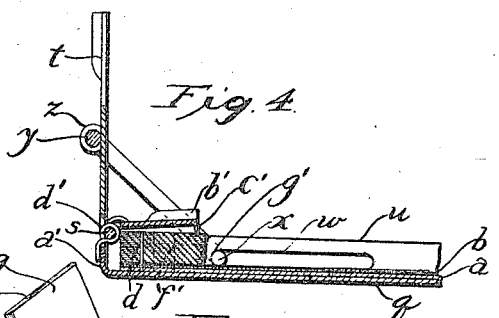
Fig. 4 is a sectional elevation on line indicated by $x^4$—$x^4$, Fig. 1.
Figure 5:
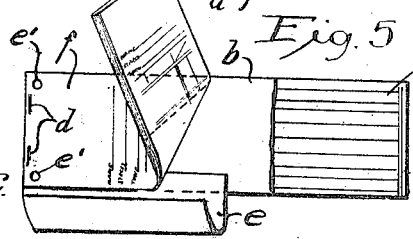
Fig. 5 is a plan view of the pad in Fig. 1, the backing being partly broken away and the leaves being partly turned back for clearness of illustration.

The abutment plate *t*, as is readily understood, may be opened to bring it substantially into a position perpendicular to the cover section *q* as in Figs. 1, 2 and 4 and is prevented from moving beyond the perpendicular position by reason of the in-turned ends *x* of the U-shaped member *y* coming into engagement with the ends *g'* of the slots *w*, said slot ends thus functioning as stops for the U-shaped member.

Figure 3:
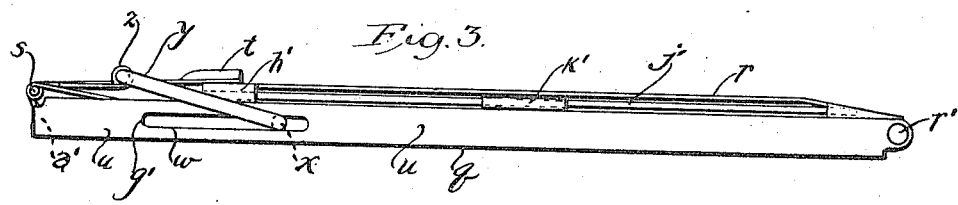
Fig. 3 is an enlarged side elevation of the pad-holding device with the parts in folded position.

When the pad is in folded position and the cover is shut, the abutment plate *t* can be swung into closed position so as to engage the outer face of the cover section *r* as in Fig. 3 and thus function to hold the cover section *r* in closed position.

It has hereinbefore been stated that the check mark *p* will be made in the appropriate column representing the width of the customer's foot, the check mark being made at the character representing the ball-measurement of said foot, and said ball-measurement may be obtained by merely passing a measuring tape around the ball of the foot, and in order that the tape may be held in a position which will make it very convenient to use with minimum loss of time I have provided special means which will now be described.

The upper cover section *r* is provided at one side edge with inwardly projecting lugs *h'* through which passes and is held in place a guide rod *j'* to which is shiftably connected by a knuckle *k'* a shiftable tape holder *l'* in the form of a flat plate provided with longitudinally extending slots *m'*, *n'*, *o'*, the slot *m'* being near one side margin of the plate and the slots *n'*, *o'* being near the other side margin of the plate and being connected with one another by a diagonally extending slot *p'*. The tape *q'* shiftably engages the slot *m'* and also either one of the slots *n'*, *o'* according to the width of the foot to be measured, the tape being slipped through the slot *p'* from one of the slots *n'*, *o'* to the other of said slots for that purpose.

From the slot $m'$ to the slot $n'$, $o'$, as the case may be, the tape $q'$ extends along the under surface of the tape-holder plate $l'$ and the end portions of said tape may be brought together over the ball of the foot to be measured so as to obtain the ball-measurement which measurement will then be checked off in the appropriate column $j$ as herein before noted.

Of course the tape-holding plate $l'$ will be adjusted lengthwise of the cover to bring the tape to the proper position at the ball of the foot to be measured and it is readily seen that when the leaf $c$ on which the measurements have been recorded has been severed from the pad the tape-holding plate may be swung on the axis formed by the guide rod $j'$ so as to bring said tape-holding plate to one side of the cover and thus enable the salesman to remove the severed leaf and insert the carbon sheet $e$ in place for a new record on another of the sheets $c$ after which the salesman will swing the tape-holding plate to position over the pad as in Fig. 1 so as to be ready for measuring another foot and making another measurement record.

In actual practice, referring more particularly to Fig. 6 and assuming for example that the length of the customer's foot being measured is $37\frac{1}{2}$ as at $o$, it is clear that if the ball measurement be, for example, $7\frac{5}{8}$ as at $ab$, the size of shoe thus indicated for the customer would be $37\frac{1}{2}$ A but the table also indicates that a shorter and wider shoe as $36\frac{1}{2}$ B (for ball measurement $7\frac{5}{8}$ as at $ac$) or a longer and narrower shoe as $38\frac{1}{2}$ AA (for ball measurement $7\frac{5}{8}$ as at $ad$) might be substituted for the $37\frac{1}{2}$ A shoe if said $37\frac{1}{2}$ A shoe when tried on does not seem to fit quite satisfactorily. The table also indicates that size 37 B (for ball measurement $7\frac{3}{4}$ as at $ae$) or 38 A (for ball measurement $7\frac{3}{4}$ as at $af$) might give the desired fit. Thus it is seen that there is a useful relation between the column of length-indicating characters $l$ and ball-measurement characters $j$ as the combination enables the shoe clerk to readily choose the size of shoe for the customer and make a permanent record of the same on the sales slip.

It is obvious that, though it is preferable to place the customer's foot on the chart for the purpose of measurement thereof, if desired the measurements may be made by the usual means and said measurements then indicated on the chart as above described.

The foregoing will enable those skilled in the art to which this invention appertains to make and use said invention.

I claim:

1. A foot-measurement device having a column of consecutively arranged length-indicating characters and having columns of ball-measurement characters, the ball-measurement characters in alinement transversely with any given length-indicating character being of different denominations and designating the various ball measurements for the length of feet indicated by said length-indicating character.

2. A foot measurement device having a column of consecutively arranged length-indicating characters and having columns of ball-measurement characters, the ball-measurement characters in alinement transversely with any given length-indicating character being of different denominations and designating the various ball measurements for the length of feet indicated by said length-indicating character, there being appropriate width-indicating characters for the various columns of ball-measurement characters.

3. The combination with a sales slip of a chart having a column of consecutively arranged length-indicating characters representing the distances between said characters respectively and the upper end of the sales slip, said chart also having columns of ball-measurement characters, the ball-measurement characters in alinement transversely with any given length-indicating character being of different denominations and designating the various ball measurements for the length of feet indicated by said length-indicating character.

4. A device of the character described comprising a foldable leaf having duplicate sales slips, one of said slips being an original and being on the obverse side and the other slip being a copy and being on the reverse side of the leaf, and a chart of length-indicating characters on the obverse side of the sheet below the copy sales slip, said chart being on the back of the original sales slip, and said length-indicating characters being at different distances from the top edge of the leaf substantially as and for the purpose described.

In testimony whereof, I have hereunto set my hand at Los Angeles, California, this 8th day of December, 1915.

PAUL A. JESBERG.

In presence of—
GEORGE H. HILES,
ANNA F. SCHMIDTBAUER.